A. STOWASSER.
SHOCK ABSORBER.
APPLICATION FILED JUNE 10, 1916.

1,217,659.

Patented Feb. 27, 1917.
2 SHEETS—SHEET 1.

Witnesses
Inventor
Anthony Stowasser
By Erwin & Wheeler
Attorney

A. STOWASSER.
SHOCK ABSORBER.
APPLICATION FILED JUNE 10, 1916.

1,217,659.

Patented Feb. 27, 1917.
2 SHEETS—SHEET 2.

UNITED STATES PATENT OFFICE.

ANTHONY STOWASSER, OF MILWAUKEE, WISCONSIN.

SHOCK-ABSORBER.

1,217,659.  Specification of Letters Patent.  Patented Feb. 27, 1917.

Application filed June 10, 1916.  Serial No. 102,816.

*To all whom it may concern:*

Be it known that I, ANTHONY STOWASSER, a citizen of the United States, residing at the city of Milwaukee, county of Milwaukee, and State of Wisconsin, have invented new and useful Improvements in Shock-Absorbers, of which the following is a specification.

My invention relates to improvements in shock absorbers.

In a former Patent No. 1,169,578, dated January 25, 1916, I have shown and described a shock absorber of the general type disclosed in this application, and the object of the present invention is to simplify the mechanism, reduce the cost of construction and increase the efficiency of such shock absorbers by employing a system of levers so arranged as to secure a counteractive effect and a distribution of the energy produced by the shock, which distribution will be accomplished both in direction and time, whereby the force of the shock will be almost completely neutralized.

In the drawings—

Like parts are identified by the same reference characters throughout the several views.

Figure 1:
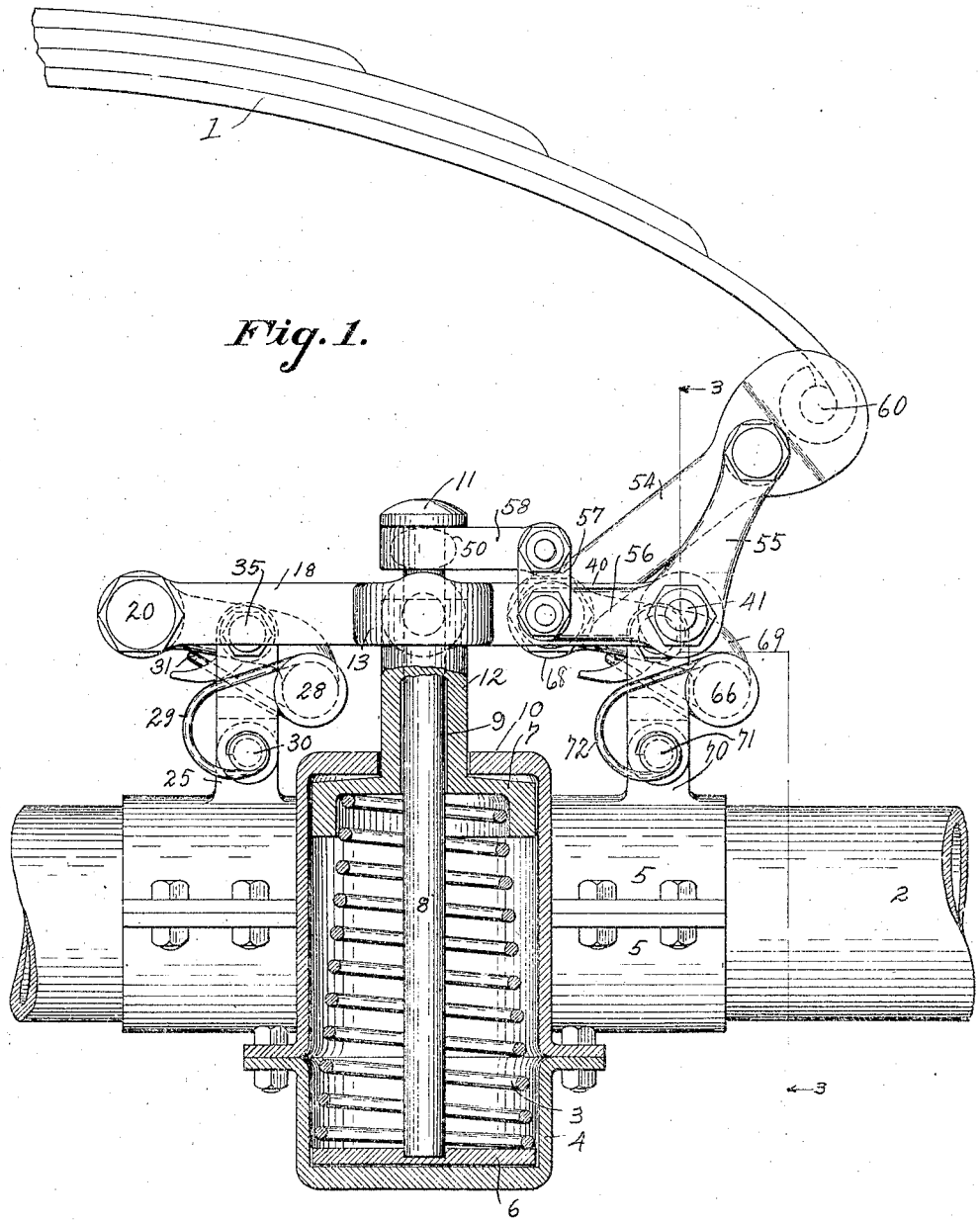
Figure 1 is a front elevation of my improved shock absorber applied to the axle of a motor driven vehicle, one of the main shock absorbing springs and its inclosing housing being illustrated in vertical section.
Figure 2:
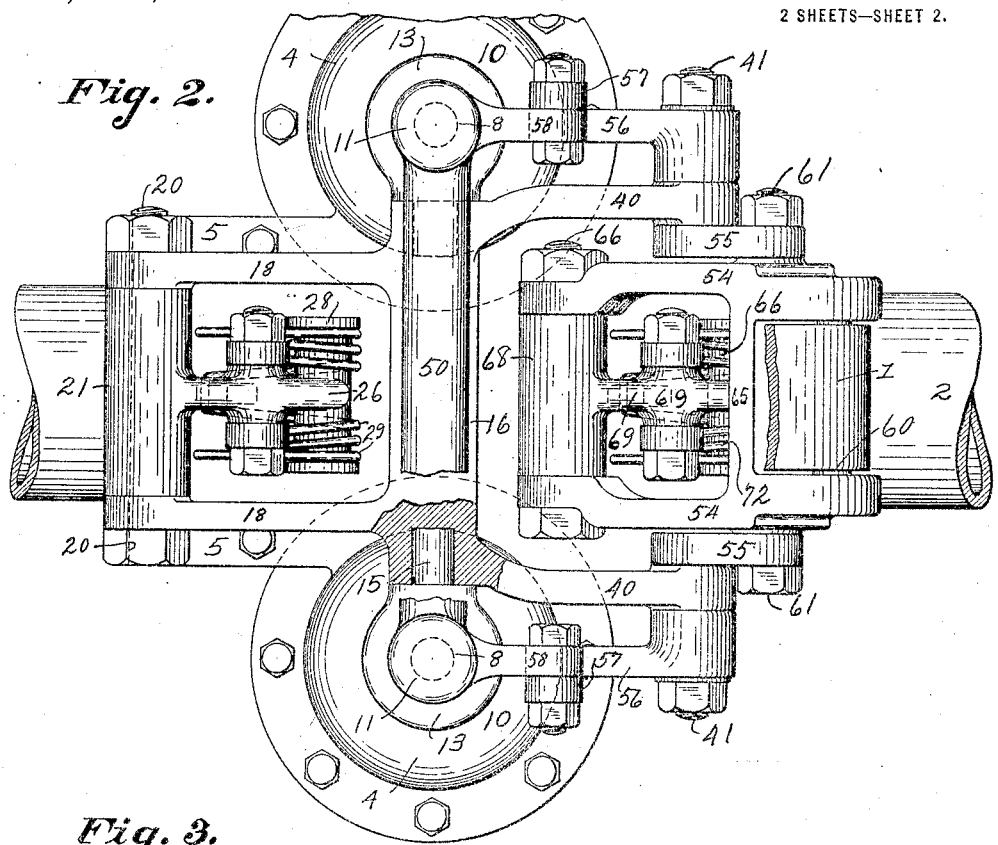
Fig. 2 is a plan view of the same.
Figure 3:
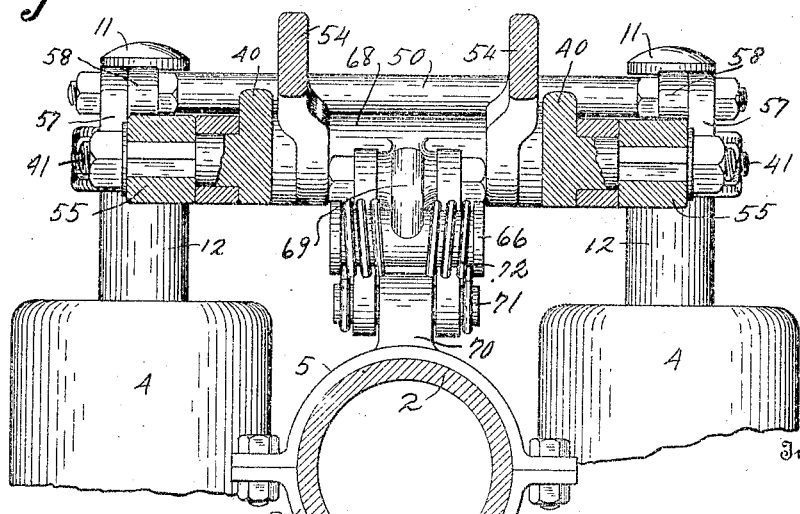
Fig. 3 is a sectional view drawn on line 3—3 of Fig. 1.

The main spring 1 supports the body of the vehicle from the axle 2 in the ordinary manner, except that my improved shock absorber is interposed and employed as a means for connecting the ends of the main spring with the axle. Each shock absorber includes a set or pair of helically coiled shock absorbing springs 3, each inclosed within a cylindrical casing 4. The set or pair of casings are rigidly connected with a set of clamping members 5, which are adapted to embrace the axle and to support the spring inclosing casings with the springs in a vertical position, one on each side of the axle. The ends of the springs 3 are provided with base and cap plates 6 and 7 respectively. The lower or base plate 6 is secured to a vertically disposed rod 8 which projects upwardly through an aperture 9 in the cap plate 7, and also through the top wall or head 10 of the casing 4, the upper end of the rod or stem 8 having a head 11. Each of the cap plates 7 is provided with an upwardly projecting sleeve 12, the upper end of which is socketed in a head piece 13 which serves as an enlarged collar, encircling the rod 8, and having a projecting pivot stud 15. These studs 15 carried by the respective collar heads 13, are located on opposite sides of and above the axle, and project inwardly toward each other and constitute resiliently yielding fulcrums for a primary lever having a central fulcrum bar 16, provided with end sockets to receive the pivot studs 15. Arms 18 project longitudinally of the axle 2 on one side of the fulcrum bar 16, and their outer ends are connected by a cross bolt 20 having a spacing sleeve 21 mounted thereon between the arms 18 and adapted to oscillate upon the bolt.

The upper clamping member 5 is provided near its respective ends with a set of upwardly projecting fulcrum posts 25 with which a lever 26 is pivotally connected. One end of this lever is connected with one of the sleeves 21. The other end projects in the direction of the vertical sleeve 12 and downwardly toward the axle along a curved line and carries a cross piece 28, around which a spring 29 is coiled. One end of this spring extends downwardly toward the axle and is coiled around a cross bolt 30 extending transversely of the axle, through the post or set of posts 25. The other end 31 of the spring 29 extends along the under side of lever 26 past the fulcrum pin or bolt 35 and tends to raise the outer end of said lever 26, thereby providing a resilient support for the sleeve 21, cross bolt 20 and the outer ends of the arms 18. On the other side of the fulcrum bar 16 from that occupied by the arms 18, the bar 16 is provided with another set of arms 40. The above mentioned primary lever comprises the fulcrum bar 16 with its projecting arms 18 on one side and arms 40 on the other side.

The arms 40 of the primary lever each provide a yielding support for a transverse bolt 41, through which a yielding connection is made between the main spring 1 and a cross head 50 supported by the collars 13. A relative movement of the connected end of the spring 1 may be transmitted to this cross head 50 through lever 54, (preferably a forked or four armed lever), bell crank arms 55, transverse bolts or bell crank fulcrum pins 41, arms 56, links 57 and arms 58, the latter being rigidly connected with cross head 50, one at each end thereof. One set of these connections is provided on each side of the extremity of the spring 1 and leads to the respective ends of cross head 50. Lever 54 is for convenience in description termed a secondary lever and is connected with the end of the spring by a bolt 60. Each bell crank arm 55 is connected with lever 54 near bolt 60 by a pivot bolt 61. Each bell crank arm 56 is rigidly secured to transverse bell crank fulcrum bolt 41 to which arm 55 is also rigidly secured. The bolt 41, however, is free to rotate in its bearing in arm 40.

Connecting bolts 61 serve as fulcrums for levers 54, the short arms of the lever being connected with the extremity of the spring at 60, and the long arms being extended inwardly between the arms 40. The lever arms are rigidly connected with each other by a cross bar 65. The inner ends or arms of this lever 54 are connected by a cross bolt 66 which is resiliently supported by a spacing sleeve 68, lever 69, clamping bracket posts 70, pivot bolt 71 and a spring 72. Lever 69 and clamping bracket posts 70, together with the associated parts, are similar in structure and arrangement to the above described lever 26 and posts 25. The spring 72 resiliently supports cross bolt 66 by means of lever 69, but owing to the fact that cross bolt 66 is at a considerable distance from the fulcrum bolt 61 upon which the lever or levers 54 oscillate, whereas the connection with the spring 1 is in close proximity to the fulcrum bolt 61, it is obvious that a comparatively light spring, such as the spring 72, may be utilized to resist swinging movements of lever 54.

Briefly reviewing the operation, it will be observed that any shock or rebounding action which tends to cause a relative approach of spring 1 and axle 2, will be absorbed as follows:

A relative upward movement of axle 2 cannot be transmitted through rods 8 for these are free to slide upwardly through the associated parts. Motion imparted to the springs 3 will be transmitted by them through the cap plates 7 and sleeve 12 to the primary lever. This lever will lift the fulcrum pins or bolts 41 of the elbow cranks but the force will be partially absorbed by the springs 29 which prevent the connected ends of the arms 18 from lifting. If bolts 20 serve as a fixed fulcrum, the motion transmitted to the elbow cranks would of course be amplified, but owing to the fact that bolt 20 is spring supported, it is adapted to yield upwardly and thereby avoid violent lifting of elbow crank fulcrum bolt 41. The motion transmitted to the elbow crank will be further modified in lever 54, the inner end of which is adapted to swing upwardly against the tension of spring 72. This leaves a comparatively light upward pressure to be transmitted to the main spring 1. Even this will be largely neutralized by the motion transmitted to cross head 50 from the collars 13 and from this cross head through the arms 58 to oscillate the elbow cranks, whereby their outer arms 55 tend to swing downwardly and impart a counteracting downward pull upon bolts 61 and lever 54.

I claim—

1. The combination with a vehicle axle, of a primary lever, a resiliently yielding fulcrum supporting said lever from the axle, a bell crank having a fulcrum pivotal connection with one arm of the primary lever, a body supporting spring, a secondary lever connecting said spring with one arm of the bell crank, resilient connections between the primary and the secondary levers respectively and the vehicle axle, and connections between one arm of the bell crank and the resiliently yielding fulcrum of the primary lever.

2. The combination with a vehicle axle, of a set of coiled springs supported therefrom, fulcrum heads supported by said springs, a primary lever having its central portion pivotally connected with said fulcrum heads, a resilient connection between one arm of said lever and the vehicle axle, a main body supporting spring, a secondary lever connected with the spring and having a fulcrum supported from the primary lever at the opposite end of the latter from that which is resiliently connected with the axle, and resilient connections between the secondary lever and the axle on the opposite side of the secondary lever fulcrum from that to which the body supporting spring is connected.

3. The combination with a vehicle axle, of a primary lever, a fulcrum therefor resiliently supported from the axle, a resilient connection between the primary lever and the axle adapted to oppose swinging movements of said lever, a main body supporting spring, a lever pivotally connected therewith, a fulcrum for said lever adjacent to its connection with the spring, and a support for said fulcrum carried by the primary lever.

4. The combination with a vehicle axle, of a primary lever, a fulcrum therefor resiliently supported from the axle, a resilient connection between the primary lever and the axle adapted to oppose swinging movements of said lever, a main body supporting spring, a lever pivotally connected therewith, a fulcrum for said lever adjacent to its connection with the spring, and a support for said fulcrum carried by the primary lever, said last mentioned fulcrum support comprising a bell crank pivotally connected with the primary lever and having link connection with the fulcrum head of the primary lever. substantially as described.

In testimony whereof I affix my signature in the presence of two witnesses.

ANTHONY STOWASSER.

Witnesses:
   LEVERETT C. WHEELER,
   IRMA D. BREMER.